(12) United States Patent
Ostendorf et al.

(10) Patent No.: US 8,987,373 B2
(45) Date of Patent: Mar. 24, 2015

(54) CROSSLINKABLE COMPOSITIONS BASED ON ORGANOSILICON COMPOUNDS

(71) Applicant: Wacker Chemie AG, Munich (DE)

(72) Inventors: Detlev Ostendorf, Dresden (DE); Uwe Scheim, Coswig (DE); Peter Schoeley, Diera-Zehren (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/225,538

(22) Filed: Mar. 26, 2014

(65) Prior Publication Data

US 2014/0309370 A1    Oct. 16, 2014

(30) Foreign Application Priority Data

Apr. 10, 2013 (DE) .......................... 10 2013 206 266

(51) Int. Cl.
*C08K 5/01* (2006.01)
*C08K 3/36* (2006.01)
*C08L 83/06* (2006.01)
*C08G 77/14* (2006.01)

(52) U.S. Cl.
CPC . *C08K 5/01* (2013.01); *C08L 83/06* (2013.01); *C08K 3/36* (2013.01); *C08G 77/14* (2013.01); *C08K 2201/002* (2013.01); *C08K 2201/006* (2013.01)
USPC .......................................... 524/588; 264/299

(58) Field of Classification Search
None
See application file for complete search history.

(56) References Cited

U.S. PATENT DOCUMENTS

| | | | |
|---|---|---|---|
| 6,451,440 B2 | 9/2002 | Atwood et al. | |
| 6,800,413 B2 * | 10/2004 | Barthel et al. | 430/108.3 |
| 7,534,409 B2 * | 5/2009 | Schumacher et al. | 423/335 |
| 7,722,849 B2 * | 5/2010 | Moerters et al. | 423/335 |
| 7,754,800 B2 * | 7/2010 | Maton et al. | 524/425 |
| 7,888,421 B2 | 2/2011 | Schoeley et al. | |
| 8,003,745 B2 * | 8/2011 | Bachon et al. | 528/28 |
| 2001/0049427 A1 | 12/2001 | Atwood et al. | |
| 2006/0201647 A1 * | 9/2006 | Schumacher et al. | 162/181.4 |
| 2008/0245476 A1 | 10/2008 | Loth et al. | |
| 2009/0110658 A1 | 4/2009 | Sakamoto et al. | |
| 2012/0031496 A1 * | 2/2012 | Schoeley et al. | 137/1 |
| 2012/0065308 A1 * | 3/2012 | Sumi et al. | 524/139 |
| 2012/0214902 A1 * | 8/2012 | Detemmerman et al. | 523/122 |

FOREIGN PATENT DOCUMENTS

| | | |
|---|---|---|
| EP | 0885921 B1 | 12/2006 |
| EP | 1884541 B1 | 9/2008 |
| EP | 2 055 750 A1 | 5/2009 |
| WO | 01/53425 A2 | 7/2001 |

OTHER PUBLICATIONS

Ullmanns Enzyklopädie der technischen Chemie (Ullmann's Encyclopedia of Industrial Chemistry), 1982, pp. 462-465, vol. 21.

* cited by examiner

*Primary Examiner* — Robert S Loewe
(74) *Attorney, Agent, or Firm* — Brooks Kushman P.C.

(57) ABSTRACT

Crosslinkable compositions based on organosilicon compounds, more particularly RTV-1 sealants, contain (A) at least one organosilicon compound having at least two condensable radicals, (B) at least one finely divided silicon dioxide having a BET surface area of 30 to 120 m²/g and a relative thickening effect $\eta_{rel}$ of 1.4 to 10, and (C) at least one hydrocarbon component which has an initial boiling point above 150° C., a final boiling point below 350° C., each at a pressure of 1013 hPa, a kinematic viscosity of 1.5 to 6.0 mm²/s as measured at 40° C., a viscosity-density constant (VDC) of less than or equal to 0.820, a pour point of less than −5° C., and an aromatic carbon atom ($C_A$) content of less than 0.1% $C_A$.

13 Claims, No Drawings

CROSSLINKABLE COMPOSITIONS BASED ON ORGANOSILICON COMPOUNDS

CROSS-REFERENCE TO RELATED APPLICATIONS

This application claims priority to German Patent Application No. 10 2013 206 266.4 filed Apr. 10, 2013 which is herein incorporated by reference.

BACKGROUND OF THE INVENTION

1. Field of the Invention

The invention relates to crosslinkable compositions based on organosilicon compounds, more particularly RTV-1 sealants, in which finely divided metal oxides with low surface area are used in combination with hydrocarbon mixtures, and which in the cured state have a high tear resistance, to methods for producing them, and to their use.

2. Background Art

One-component silicon rubber mixtures which are storable with exclusion of water but undergo condensation crosslinking to elastomers at room temperature on ingress of water (RTV-1 compositions) are long-established products. They are employed in large quantities in, for example, the construction industry, as a sealant for joints. The bases of these mixtures are polydiorganosiloxanes which include at least two reactive groups, such as OH, acyloxy, oxime, alkoxy, or vinyl groups, for instance, in the molecule. These compositions may further comprise fillers, plasticizers, crosslinkers, catalysts, and additives.

The performance properties of the cured product and also the specific properties of the crosslinkable composition during application are determined primarily by the average chain length of the crosslinkable polydiorganosiloxanes, by the presence of plasticizers, and by the activity of the finely divided reinforcing fillers, which correlates with, among other factors, the BET surface area of the filler particles. Furthermore, other components as well, such as adhesion promoters and crosslinkers, have an influence on certain paste properties and vulcanizate properties. The influence of catalysts on the mechanical vulcanizate properties of the composition can very often be disregarded.

The individual raw materials and their proportions in the RTV-1 composition are often selected so as to obtain an extremely balanced relationship between the physical properties. This is important especially since optimizing the properties of the compositions in the uncured state often undesirably alters the properties of the composition in the cured state. For example, it is indeed the case that a high proportion of reinforcing fillers, such as fumed silicon dioxide, in the RTV-1 sealant results in a desirably high "body", i.e., in a relatively high viscosity and hence in a greater resistance to the deformation when the compositions are being smoothed in a joint that is to be sealed. At the same time, however, a greater proportion of reinforcing filler also reduces the rate of extrusion of the paste from the cartridge and drastically increases the modulus of the vulcanized composition (the value of the tensile stress at a defined strain of a test specimen), which is undesirable. This often then means that at least one of these properties cannot be set optimally for the application.

Plasticizers influence the rheological properties of the uncured paste and also the mechanical properties of the cured silicon rubber; for example, replacing silicone polymer by silicone plasticizers or organic plasticizers increases the extrusion rate, but the hardness is reduced.

Further important properties of the cured and uncured RTV-1 sealant that can in general not be influenced independently of one another are, for example, sag resistance, volume shrinkage, or else adhesion to different substrates.

Crosslinkable polydiorganosiloxanes used typically for RTV-1 sealants in the construction sector are high-viscosity polydimethylsiloxanes having hydrolyzable end groups and a dynamic viscosity of 10,000 to 350,000 mPa·s at 25° C. They crosslink by elimination of, for example, alcohols, oximes, or acetic acid. The plasticizers used are required to be highly compatible with the crosslinkable polydiorganosiloxanes, so that they remain in the product and are not excreted as an oily liquid from the vulcanized silicone rubber (a phenomenon known as vulcanizate bleeding, exudation, or oiling-out). Preferred plasticizers, accordingly, are either polydiorganosiloxanes without hydrolyzable groups or hydrocarbon mixtures. Customary polydiorganosiloxane-based plasticizers are trimethylsilyl-terminated polydimethylsiloxanes which have a dynamic viscosity in the range from 100 to 10,000 mPa·s at 25° C. Suitable organic plasticizers are described in EP-B1-885 921, for example, such as paraffinic hydrocarbon mixtures which have an initial boiling point above 290° C., a kinematic viscosity of 5 mm$^2$/s to 10 mm$^2$/s, as measured at 40° C., a viscosity-density constant (VDC) of less than 0.82, and a molecular weight of not more than 310 g/mol, and which contain 60% to 80% of paraffinic, 20% to 40% of naphthenic, and not more than 1% of aromatic carbon atoms. The disadvantage of these plasticizers, however, is that when used in substantial amounts of more than 40 parts by weight, based on 100 parts by weight of crosslinkable polydiorganosiloxane in the RTV-1 mixture, incompatibilities with the vulcanized siloxane matrix are manifested by exudation of constituents with relatively high molecular weight, especially if the mixture at the same time includes constituents which influence the rheological properties of the paste, such as polyglycols. Moreover, the vulcanizates identified in the working examples of EP-B1-885 921 have low tear resistance values; according to the present state of the art, construction sealants have tear resistance values of between 3 and 6 N/mm, as measured by DIN ISO 34-1 Method C. The latter also applies to RTV-1 mixtures which comprise hydrocarbon mixtures with a relatively low boiling range. Highly compatible hydrocarbon mixtures are known, for instance, from U.S. Pat. No. 6,451,440 B2, containing 45-75 wt % of naphthenic and 25-55 wt % of noncyclic paraffinic hydrocarbons. Other hydrocarbon mixtures which have very high compatibility with the high-viscosity, crosslinkable polydimethylsiloxanes lead frequently to an undesirably high level of volume shrinkage, exhibit incompatibilities with the siloxane matrix at relatively low temperatures, or lead rapidly to the yellowing of the material.

Fillers used are primarily finely divided, fumed silicon dioxides, since with these it is also possible to produce transparent compositions. For technical reasons, finely divided silicon dioxides having BET surface areas of 130 to 200 m$^2$/g have become established. Grades with 130 to 150 m$^2$/g are used with preference. EP-B1-1 884 541, for example, describes a method for continuous production of RTV-1 sealants, using a silicon dioxide having a BET surface area of 150 m$^2$/g.

Finely divided, pyrogenic silicon dioxides with lower activity, i.e., having BET surface areas of below 120 m$^2$/g, are used hardly at all in practice, since their reinforcing effect is inadequate. Where low quantities are used, compositions are obtained that have low viscosity and hence inadequate sag resistance, and, when large quantities are used, compositions are obtained that have an excessive modulus.

US-A1-2008/0245476 describes the use of silicon dioxides having BET surface areas of 10 to 90 m²/g for producing silane-crosslinking polyethers featuring high tensile shear strength. At a proportion of 15 wt % of finely divided silica, however, the plasticizer-free compositions described are unsuitable for sealing construction joints, owing to insufficient stretchability. Moreover, compositions based on polyethers have a chemical stability which is much too low for exterior applications.

Finely divided, fumed silicon dioxides having very high BET surface areas of more than 150 m²/g have too high a thickening effect. Moreover, these silicon dioxides likewise have the disadvantage that it is impossible simultaneously to reconcile performance properties such as excellent sag resistance, optimum extrusion rates, and low values for tensile stress under strain. Furthermore, compounding with these highly active silicon dioxide grades is substantially more difficult, since their dispersibility is significantly poorer, particularly at the necessarily relatively low amounts employed.

RTV-1 sealants which contain no other fillers such as calcium carbonate, for example, customarily comprise finely divided silicon dioxides in amounts of about 6 to 12 wt %, based on the total weight. The compositions are then easily expressed from cartridges, have sufficiently high resistance to deformation during smoothing, do not run out from vertical joints, and cure to rubber-elastic materials with a low modulus. Such compositions are therefore very well suited to the sealing of construction joints. An unsatisfactory feature, however, is the low tear resistance of these sealants. It would therefore be desirable if RTV-1 sealants with high tear resistance could be provided.

SUMMARY OF THE INVENTION

The invention provides compositions crosslinkable by condensation reaction, comprising
(A) at least one organosilicon compound having at least two condensable radicals,
(B) at least one finely divided silicon dioxide having a BET surface area of 30 to 120 m²/g and a relative thickening effect $\eta_{rel}$ of 1.4 to 10, and
(C) at least one hydrocarbon component which has an initial boiling point above 150° C., a final boiling point below 350° C., each at a pressure of 1013 hPa, a kinematic viscosity of 1.5 to 6.0 mm²/s as measured at 40° C., a viscosity-density constant (VDC) of less than or equal to 0.820, a pour point of less than −5° C., and an aromatic carbon atom ($C_A$) content of less than 0.1% $C_A$.

DETAILED DESCRIPTION OF THE PREFERRED EMBODIMENT(S)

In the context of the present invention, the BET surface area is determined in accordance with DIN ISO 9277/DIN 66132.

Thickening effect in the context of the present invention identifies the dynamic viscosity in mPa·s of a dispersion at 25° C., as determined using a rotational viscosimeter (RS600 from Haake, DIN 53019 measuring system, cone/plate C60/2 Ti) at a shear rate of 10 s⁻¹. The "relative thickening effect" $\eta_{rel}$ is the ratio of $\eta$ to $\eta_0$, where $\eta$ corresponds to the dynamic viscosity of the liquid with silicon dioxide, and $\eta_0$ to the dynamic viscosity of the pure liquid without silicon dioxide: $\eta_{rel}=\eta/\eta_0$. The dispersion is obtained by incorporating 4.5 g of silicon dioxide powder into 145.5 g of a styrene solution of an unsaturated, isophthalic acid-based polyester resin, said solution having a dynamic viscosity of 1000±100 mPa·s at 23° C. and a styrene mass fraction of 34%, measured in accordance with DIN 16945, 4.14 (available commercially under the name Palatal® P6 from BASF SE, Ludwigshafen, DE), with stirring at a temperature of 23° C. in a 0.5 l beaker, and then carrying out dispersion using a dissolver (Pendraulik laboratory dissolver LD 50 with 40 mm toothed disk) at 2800 min⁻¹ for 5 minutes. The distance of the dissolver disk from the bottom of the beaker in this procedure is approximately 20 mm. In the course of the dispersing procedure, the beaker is covered with a drilled lid.

In the context of the present invention, the dynamic viscosity of the organosilicon compounds (A) is measured in accordance with DIN 53019 at 25° C., unless otherwise indicated, by means of a Physica MCR 300 rotational rheometer from Anton Paar. This is done using a coaxial cylinder measuring system (CC 27) with an annular measuring gap of 1.13 mm for viscosities from 10 to 200 mPa·s and a cone/plate measuring system (Searle System with CP 50-1 measuring cone) for viscosities greater than 200 mPa·s. The shear rate is adapted to the polymer viscosity (5 to 99 mPa·s at 100 1/s; 100 to 999 mPa·s at 200 1/s; 1000 to 2999 mPa·s at 120 1/s; 3000 to 4999 mPa·s at 80 1/s; 5000 to 9999 mPa·s at 62 1/s; 10,000 to 12,499 mPa·s at 50 1/s; 12,500 to 15,999 mPa·s at 38.5 1/s; 16,000 to 19,999 mPa·s at 33 1/s; 20,000 to 24,999 mPa·s at 25 1/s; 25,000 to 29,999 mPa·s at 20 1/s; 30,000 to 39,999 mPa·s at 17 1/s; 40,000 to 59,999 mPa·s at 10 1/s; 60,000 to 149,999 at 5 1/s; 150,000 to 199,999 mPa·s at 3.3 1/s; 200,000 to 299,999 mPa·s at 2.5 1/s; 300,000 to 1,000,000 mPa·s at 1.5 1/s).

After the measuring system has been conditioned to the measuring temperature, a three-stage measuring program is employed, consisting of a run-up phase, preliminary shearing, and viscosity measurement. The run-up phase takes place by graduated increase of the shear rate within a minute to the shear rate as indicated above at which the measurement is to take place, this rate being dependent on the anticipated viscosity. As soon as this has been achieved, preliminary shearing takes place for 30 seconds at constant shear rate, after which the viscosity is determined by performance of 25 individual measurements each for 4.8 seconds, from which the average value is determined. The average value corresponds to the dynamic viscosity, which is reported in mPa·s.

The initial boiling point and the final boiling point are each determined according to ASTM D 86.

The kinematic viscosity is measured at 40° C. in accordance with ASTM D 445-12.

The viscosity-density constant (VDC) is determined in accordance with ASTM D 2140-08. The relative density needed for the calculation of the VDC is measured at 15.6° C. in accordance with ASTM D 1481-12.

The pour point is measured in accordance with ASTM D 97.

In the context of the present invention, the term "condensation reaction" is also intended to encompass any preceding hydrolysis step.

The compositions of the invention may be one-component or multicomponent compositions, and are preferably one-component compositions which are storable with exclusion of water but crosslinkable at room temperature on ingress of water (RTV-1).

In the context of the present invention, the term "condensable radicals" is also intended to refer to those radicals which include any preceding hydrolysis step.

The condensable groups possessed by the organosilicon compounds used that participate in the crosslinking reaction may be any desired groups, preferably hydroxyl, organyloxy, oximo, amino, aminoxy, or acyloxy groups.

The organosilicon compounds (A) used in accordance with the invention may be any organosilicon compounds having at least two condensable groups that are useable in compositions crosslinkable by a condensation reaction. They may be pure siloxanes, i.e., ≡Si—O—Si≡ structures, or else silcarbanes, i.e., ≡Si—R"—Si≡ structures, where R" is a divalent hydrocarbon radical which is optionally substituted or interrupted by heteroatoms, or any desired polymers and copolymers containing organosilicon groups.

The organosilicon compounds (A) used in accordance with the invention are preferably compounds comprising units of the formula $$R_aY_bSiO_{(4-a-b)/2} \quad (I),$$

where
R may be identical or different and denotes optionally substituted hydrocarbon radicals which may be interrupted by oxygen atoms,
Y may be identical or different and denotes hydroxyl radicals or hydrolyzable radicals,
a is 0, 1, 2, or 3, preferably 1 or 2, and
b is 0, 1, 2, or 3, preferably 0, 1, or 2, more preferably 0 or 1, with the proviso that the sum total of a+b is less than or equal to 3 and there are at least two radicals Y present per molecule.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as the o-, m-, p-tolyl radicals xylyl radicals and ethylphenyl radicals; and aralkyl radicals such as the benzyl radical, and the α- and β-phenylethyl radical.

Examples of substituted radicals R are haloalkyl radicals such as the 3,3,3-trifluoroprop-1-yl radical, the 1,1,1,3,3,3-hexafluoroprop-2-yl radical, and the heptafluoroprop-2-yl radical; haloaryl radicals such as the o-, m-, and p-chlorophenyl radicals, alkoxyalkyl radicals such as the 2-methoxyethyl radical, the 2-ethoxyethyl radical, the 2-methoxyprop-1-yl radical, the 2-(2-methoxyethoxy)ethyl radical, and the 2-(2-ethoxyethoxy)ethyl radical; acryloyloxy radicals such as the 3-methacryloyloxypropyl radical; epoxide radicals such as the 3-glycidyloxypropyl radical; and aminoalkyl radicals such as the 3-aminopropyl radical, the N-(2-aminoethyl)-3-aminopropyl radical, the (2,3,5,6-tetrahydro-1,4-oxazin-4-yl)methyl radical, the (N,N-di-n-butylamino)methyl radical, the (N-cyclohexylamino)methyl radical, the (N-n-butylamino)methyl radical, the (2,3,4,5-tetrahydropyrrol-1-yl) methyl radical, and the (2,3,4,5,6-hexahydropyrid-1-yl)methyl radical.

Radical R may alternatively comprise divalent radicals, which, for example, join two silyl groups to one another, although this is not preferred. Examples of divalent radicals R are polyisobutylenediyl radicals and propanediyl-terminated polypropylene glycol radicals.

Radical R preferably comprises monovalent hydrocarbon radicals having 1 to 18 carbon atoms, optionally substituted by halogen atoms, amino groups, ether groups, ester groups, epoxy groups, mercapto groups, cyano groups, acryloyloxy radicals, tri-methoxysilylethyl groups, triethoxysilylethyl groups, or (poly)glycol radicals, the latter being constructed from oxyethylene and/or oxypropylene units, and more preferably comprises alkyl radicals having 1 to 12 carbon atoms, the vinyl, phenyl, or (2,3,5,6-tetrahydro-1,4-oxazin-4-yl)methyl radical. Preferably at least 90% of the radicals R in the organosilicon compound (A) are methyl radicals. In organosilicon compound (A), (2,3,5,6-tetrahydro-1,4-oxazin-4-yl) methyl radicals R are preferably bonded to the silicon atom which carries radicals Y.

Examples of radicals Y are the hydroxyl radical and all hydrolyzable radicals known to date, such as, for example, optionally substituted hydrocarbon radicals bonded via oxygen atoms or nitrogen atoms to a silicon atom.

Radical Y preferably comprises a hydroxyl radical, organyloxy radicals such as the methoxy, ethoxy, n-propoxy, isopropoxy-, n-butoxy, isobutoxy, sec-butoxy, tert-butoxy, and 2-methoxyethoxy radicals; amino radicals, such as the methylamino, dimethylamino, ethylamino, diethylamino, and cyclohexylamino radicals; amido radicals, such as the N-methylacetamido and benzamido radicals; aminoxy radicals such as the diethylaminoxy radical; oximo radicals such as the methylethylketoximo, methylisobutylketoximo, methyl-n-butylketoximo, methylisopropylketoximo, methyl-n-propylketoximo, methylisopentylketoximo, methylneopentylketoximo, methyl-n-pentylketoximo, methyl-sec-pentylketoximo, and dimethylketoximo radicals; enoxy radicals such as the 2-propenoxy radical; acyloxy radicals such as the acetoxy radical or lactate radical.

More preferably, radical Y comprises hydroxyl radicals and also methoxy, ethoxy, acetoxy, methyllactate, ethyllactate, methylethylketoximo, methyl-n-butylketoximo, methylisobutylketoximo, methyl-n-propylketoximo, methylisopropylketoximo, or dimethylketoximo radicals. More particularly, radical Y comprises hydroxyl radicals and also methoxy, ethoxy, dimethylketoximo, methyl-n-propylketoximo, methylisopropylketoximo, or acetoxy radicals.

With particular preference, organosilicon compounds (A) used in accordance with the invention are compounds of the formula $$Y_{3-f}R_fSi—O—(SiR_2—O)_e—SiR_fY_{3-f} \quad (II),$$

where
R and Y may each be identical or different, and have one of the definitions indicated above,
e is 30 to 3000, and
f is 0, 1, or 2.

Preferably, f is 2 when Y is —OH, and f is 1 or 0 when Y is other than —OH.

Examples of organosilicon compounds (A) are those of the formula $$Y_{3-f}R_fSi—O—[SiMe_2O]_{30-2000}—SiR_fY_{3-f},$$

where the end groups —SiR$_f$Y$_{3-f}$, which may be identical or different, are alkoxysilyl end groups, e.g., —Si(OMe)$_2$Me, —Si(OMe)$_3$, —Si(OEt)$_2$Me, —Si(OMe)(OEt)Me, —Si(OMe)$_2$Et, —Si(OEt)$_2$Et, —Si(OEt)$_3$, —Si(OMe)(OEt)Et, —Si(OMe)$_2$(n-C$_8$H$_{17}$), —Si(OEt)$_2$(n-C$_8$H$_{17}$), —Si(OMe)(OEt)(n-C$_8$H$_{17}$), —Si(OMe)$_2$(CH$_2$—CH(CH$_3$)—CH$_2$—C(CH$_3$)$_2$—CH$_3$), —Si(OEt)$_2$(CH$_2$—CH(CH$_3$)—CH$_2$—C(CH$_3$)$_2$—CH$_3$), —Si(OMe)(OEt)(CH$_2$—CH(CH$_3$)—CH$_2$—C(CH$_3$)$_2$—CH$_3$), —Si(OMe)$_2$(CH$_2$—CH(CH$_2$—CH$_3$)—(CH$_2$)$_3$—CH$_3$), —Si(OEt)$_2$(CH$_2$—CH(CH$_2$—CH$_3$)—(CH$_2$)$_3$—CH$_3$), —Si(OMe)(OEt)(CH$_2$—CH(CH$_2$—CH$_3$)—(CH$_2$)$_3$—CH$_3$), —Si(OMe)$_2$Vi, —Si(OEt)$_2$Vi, —Si(OMe)(OEt)Vi, —Si(OMe)$_2$Ph, —Si(OEt)$_2$Ph, —Si(OMe)(OEt)Ph, —Si(OMe)$_2$(CH$_2$—N(n-C$_4$H$_9$)$_2$), —Si(OEt)$_2$(CH$_2$—N (n-C$_4$H$_9$)$_2$), —Si(OMe)$_2$(CH$_2$—NH(C$_4$H$_9$)), —Si(OEt)$_2$(CH$_2$—NH(C$_4$H$_9$)), —Si(OMe)$_2$(CH$_2$—NH(cyclo-C$_6$H$_{11}$)), —Si(OEt)$_2$(CH$_2$—NH(cyclo-C$_6$H$_{11}$)), —Si(OMe)$_2$(CH$_2$-(2,3,5,6-tetrahydro-1,4-oxazin-4-yl)), —Si(OEt)$_2$(CH$_2$-(2,3,5,6-tetrahydro-1,4-oxazin-4-yl)), —Si(OMe)$_2$(CH$_2$-(2,3,4,5-tetrahydropyrrol-1-yl)), —Si(OEt)$_2$(CH$_2$-(2,3,4,5-tetrahydropyrrol-1-yl)), —Si(OMe)$_2$(CH$_2$-(2,3,4,5,6-hexahydropyrid-1-yl)), and —Si(OEt)$_2$(CH$_2$-(2,3,4,5,6-hexahydropyrid-1-yl));

acetyloxysilyl end groups, e.g., —SiMe(O—CO—(CH$_3$))$_2$, —SiEt(O—CO—(CH$_3$))$_2$, —SiVi(O—CO—(CH$_3$))$_2$, —Si(O—CO—(CH$_3$))$_3$, —Si(n-C$_8$H$_{17}$)(O—CO—(CH$_3$))$_2$, —Si(CH$_2$—CH(CH$_3$)—CH$_2$—C(CH$_3$)$_2$—CH$_3$)(O—CO—(CH$_3$))$_2$, and —Si(CH$_2$—CH(CH$_2$—CH$_3$)—(CH$_2$)$_3$—CH$_3$)(O—CO—(CH$_3$))$_2$;

oximosilyl end groups, e.g., —SiMe(OMe)(O—N=C(Me)(Et)), —SiVi(OMe)(O—N=C(Me)(Et)), —SiPh(OMe)(O—N=C(Me)(Et)), —SiEt(OMe)(O—N=C(Me)(Et)), —SiMe(OEt)(O—N=C(Me)(Et)), —SiVi(OEt)(O—N=C(Me)(Et)), —SiPh(OEt)(O—N=C(Me)(Et)), —SiEt(OEt)(O—N=C(Me)(Et)), —Si(OMe)$_2$(O—N=C(Me)(Et)), —Si(OEt)$_2$(O—N=C(Me)(Et)), —Si(OMe)(O—N=C(Me)(Et))$_2$, —Si(OEt)(O—N=C(Me)(Et))$_2$, —SiMe(O—N=C(Me)(Et))$_2$, —SiEt(O—N=C(Me)(Et))$_2$, —SiVi(O—N=C(Me)(Et))$_2$, —SiPh(O—N=C(Me)(Et))$_2$, —Si(O—N=C(Me)(Et))$_3$, —Si(n-C$_8$H$_{17}$)(O—N=C(Me)(Et))$_2$, —Si(CH$_2$—CH(CH$_3$)—CH$_2$—C(CH$_3$)$_2$—CH$_3$)(O—N=C(Me)(Et))$_2$, —Si(CH$_2$—CH(CH$_2$—CH$_3$)—(CH$_2$)$_3$—CH$_3$)(O—N=C(Me)(Et))$_2$, —Si(n-C$_8$H$_{17}$)(OMe)(O—N=C(Me)(Et))$_2$, —Si(CH$_2$—CH(CH$_3$)—CH$_2$—C(CH$_3$)$_2$—CH$_3$)(OMe)(O—N=C(Me)(Et)), —Si(CH$_2$—CH(CH$_2$—CH$_3$)—(CH$_2$)$_3$—CH$_3$)(OMe)(O—N=C(Me)(Et)), —Si(n-C$_8$H$_{17}$)(OEt)(O—N=C(Me)(Et)), —Si(CH$_2$—CH(CH$_3$)—CH$_2$—C(CH$_3$)$_2$—CH$_3$)(OEt)(O—N=C(Me)(Et)), —Si(CH$_2$—CH(CH$_2$—CH$_3$)—(CH$_2$)$_3$—CH$_3$)(OEt)(O—N=C(Me)(Et)), —SiMe(OMe)(O—N=C(Me)(iso-C$_4$H$_9$)), —SiVi(OMe)(O—N=C(Me)(iso-C$_4$H$_9$)), —SiPh(OMe)(O—N=C(Me)(iso-C$_4$H$_9$)), —SiEt(OMe)(O—N=C(Me)(iso-C$_4$H$_9$)), —SiMe(OEt)(O—N=C(Me)(iso-C$_4$H$_9$)), —SiVi(OEt)(O—N=C(Me)(iso-C$_4$H$_9$)), —SiPh(OEt)(O—N=C(Me)(iso-C$_4$H$_9$)), —SiEt(OEt)(O—N=C(Me)(iso-C$_4$H$_9$)), —Si(OMe)$_2$(O—N=C(Me)(iso-C$_4$H$_9$)), —Si(OEt)$_2$(O—N=C(Me)(iso-C$_4$H$_9$)), —Si(OMe)(O—N=C(Me)(iso-C$_4$H$_9$))$_2$, —Si(OEt)(O—N=C(Me)(iso-C$_4$H$_9$))$_2$, —SiMe(O—N=C(Me)(iso-C$_4$H$_9$))$_2$, —SiEt(O—N=C(Me)(iso-C$_4$H$_9$))$_2$, —SiVi(O—N=C(Me)(iso-C$_4$H$_9$))$_2$, —SiPh(O—N=C(Me)(iso-C$_4$H$_9$))$_2$, —Si(O—N=C(Me)(iso-C$_4$H$_9$))$_3$, —SiMe(OMe)(O—N=C(Me)(n-C$_5$H$_{11}$)), —SiVi(OMe)(O—N=C(Me)(n-C$_5$H$_{11}$)), —SiPh(OMe)(O—N=C(Me)(n-C$_5$H$_{11}$)), —SiEt(OMe)(O—N=C(Me)(n-C$_5$H$_{11}$)), —SiMe(OEt)(O—N=C(Me)(n-C$_5$H$_{11}$)), —SiVi(OEt)(O—N=C(Me)(n-C$_5$H$_{11}$)), —SiPh(OEt)(O—N=C(Me)(n-C$_5$H$_{11}$)), —SiEt(OEt)(O—N=C(Me)(n-C$_5$H$_{11}$)), —Si(OMe)$_2$(O—N=C(Me)(n-C$_5$H$_{11}$)), —Si(OEt)$_2$(O—N=C(Me)(n-C$_5$H$_{11}$)), —Si(OMe)(O—N=C(Me)(n-C$_5$H$_{11}$))$_2$, —Si(OEt)(O—N=C(Me)(n-C$_5$H$_{11}$))$_2$, —SiMe(O—N=C(Me)(n-C$_5$H$_{11}$))$_2$, —SiEt(O—N=C(Me)(n-C$_5$H$_{11}$))$_2$, —SiVi(O—N=C(Me)(n-C$_5$H$_{11}$))$_2$, —SiPh(O—N=C(Me)(n-C$_5$H$_{11}$))$_2$, —Si(O—N=C(Me)(n-C$_5$H$_{11}$))$_3$, —SiMe(OMe)(O—N=C(Me)(iso-C$_5$H$_{11}$)), —SiVi(OMe)(O—N=C(Me)(iso-C$_5$H$_{11}$)), —SiPh(OMe)(O—N=C(Me)(iso-C$_5$H$_{11}$)), —SiEt(OMe)(O—N=C(Me)(iso-C$_5$H$_{11}$)), —SiMe(OEt)(O—N=C(Me)(iso-C$_5$H$_{11}$)), —SiVi(OEt)(O—N=C(Me)(iso-C$_5$H$_{11}$)), —SiPh(OEt)(O—N=C(Me)(iso-C$_5$H$_{11}$)), —SiEt(OEt)(O—N=C(Me)(iso-C$_5$H$_{11}$)), —Si(OMe)$_2$(O—N=C(Me)(iso-C$_5$H$_{11}$)), —Si(OEt)$_2$(O—N=C(Me)(iso-C$_5$H$_{11}$)), —Si(OMe)(O—N=C(Me)(iso-C$_5$H$_{11}$))$_2$, —Si(OEt)(O—N=C(Me)(iso-C$_5$H$_{11}$))$_2$, —SiMe(O—N=C(Me)(iso-C$_5$H$_{11}$))$_2$, —SiEt(O—N=C(Me)(iso-C$_5$H$_{11}$))$_2$, —SiVi(O—N=C(Me)(iso-C$_5$H$_{11}$))$_2$, —SiPh(O—N=C(Me)(iso-C$_5$H$_{11}$))$_2$, —Si(O—N=C(Me)(iso-C$_5$H$_{11}$))$_3$, —SiMe(OMe)(O—N=C(Me)(sec-C$_5$H$_{11}$)), —SiVi(OMe)(O—N=C(Me)(sec-C$_5$H$_{11}$)), —SiPh(OMe)(O—N=C(Me)(sec-C$_5$H$_{11}$)), —SiEt(OMe)(O—N=C(Me)(sec-C$_5$H$_{11}$)), —SiMe(OEt)(O—N=C(Me)(sec-C$_5$H$_{11}$)), —SiVi(OEt)(O—N=C(Me)(sec-C$_5$H$_{11}$)), —SiPh(OEt)(O—N=C(Me)(sec-C$_5$H$_{11}$)), —SiEt(OEt)(O—N=C(Me)(sec-C$_5$H$_{11}$)), —Si(OMe)$_2$(O—N=C(Me)(sec-C$_5$H$_{11}$)), —Si(OEt)$_2$(O—N=C(Me)(sec-C$_5$H$_{11}$)), —Si(OMe)(O—N=C(Me)(sec-C$_5$H$_{11}$))$_2$, —Si(OEt)(O—N=C(Me)(sec-C$_5$H$_{11}$))$_2$, —SiMe(O—N=C(Me)(sec-C$_5$H$_{11}$))$_2$, —SiEt(O—N=C(Me)(sec-C$_5$H$_{11}$))$_2$, —SiVi(O—N=C(Me)(sec-C$_5$H$_{11}$))$_2$, —SiPh(O—N=C(Me)(sec-C$_5$H$_{11}$))$_2$, —Si(O—N=C(Me)(sec-C$_5$H$_{11}$))$_3$, —SiMe(OMe)(O—N=C(Me)(neo-C$_5$H$_{11}$)), —SiVi(OMe)(O—N=C(Me)(neo-C$_5$H$_{11}$)), —SiPh(OMe)(O—N=C(Me)(neo-C$_5$H$_{11}$)), —SiEt(OMe)(O—N=C(Me)(neo-C$_5$H$_{11}$)), —SiMe(OEt)(O—N=C(Me)(neo-C$_5$H$_{11}$)), —SiVi(OEt)(O—N=C(Me)(neo-C$_5$H$_{11}$)), —SiPh(OEt)(O—N=C(Me)(neo-C$_5$H$_{11}$)), —SiEt(OEt)(O—N=C(Me)(neo-C$_5$H$_{11}$)), —Si(OMe)$_2$(O—N=C(Me)(neo-C$_5$H$_{11}$)), —Si(OEt)$_2$(O—N=C(Me)(neo-C$_5$H$_{11}$)), —Si(OMe)(O—N=C(Me)(neo-C$_5$H$_{11}$))$_2$, —Si(OEt)(O—N=C(Me)(neo-C$_5$H$_{11}$))$_2$, —SiMe(O—N=C(Me)(neo-C$_5$H$_{11}$))$_2$, —SiEt(O—N=C(Me)(neo-C$_5$H$_{11}$))$_2$, —SiVi(O—N=C(Me)(neo-C$_5$H$_{11}$))$_2$, —SiPh(O—N=C(Me)(neo-C$_5$H$_{11}$))$_2$, —Si(O—N=C(Me)(neo-C$_5$H$_{11}$))$_3$, —SiMe(OMe)(O—N=C(Me)(n-C$_3$H$_7$)), —SiVi(OMe)(O—N=C(Me)(n-C$_3$H$_7$)), —SiPh(OMe)(O—N=C(Me)(n-C$_3$H$_7$)), —SiEt(OMe)(O—N=C(Me)(n-C$_3$H$_7$)), —SiMe(OEt)(O—N=C(Me)(n-C$_3$H$_7$)), —SiVi(OEt)(O—N=C(Me)(n-C$_3$H$_7$)), —SiPh(OEt)(O—N=C(Me)(n-C$_3$H$_7$)), —SiEt(OEt)(O—N=C(Me)(n-C$_3$H$_7$)), —Si(OMe)$_2$(O—N=C(Me)(n-C$_3$H$_7$)), —Si(OEt)$_2$(O—N=C(Me)(n-C$_3$H$_7$)), —Si(OMe)(O—N=C(Me)(n-C$_3$H$_7$))$_2$, —Si(OEt)(O—N=C(Me)(n-C$_3$H$_7$))$_2$, —SiMe(O—N=C(Me)(n-C$_3$H$_7$))$_2$, —SiEt(O—N=C(Me)(n-C$_3$H$_7$))$_2$, —SiVi(O—N=C(Me)(n-C$_3$H$_7$))$_2$, —SiPh(O—N=C(Me)(n-C$_3$H$_7$))$_2$, —Si(O—N=C(Me)(n-C$_3$H$_7$))$_3$, —SiMe(OMe)(O—N=C(Me)(iso-C$_3$H$_7$)), —SiVi(OMe)(O—N=C(Me)(iso-C$_3$H$_7$)), —SiPh(OMe)(O—N=C(Me)(iso-C$_3$H$_7$)), —SiEt(OMe)(O—N=C(Me)(iso-C$_3$H$_7$)), —SiMe(OEt)(O—N=C(Me)(iso-C$_3$H$_7$)), —SiVi(OEt)(O—N=C(Me)(iso-C$_3$H$_7$)), —SiPh(OEt)(O—N=C(Me)(iso-C$_3$H$_7$)), —SiEt(OEt)(O—N=C(Me)(iso-C$_3$H$_7$)), —Si(OMe)$_2$(O—N=C(Me)(iso-C$_3$H$_7$)), —Si(OEt)$_2$(O—N=C(Me)(iso-C$_3$H$_7$)), —Si(OMe)(O—N=C(Me)(iso-C$_3$H$_7$))$_2$, —Si(OEt)(O—N=C(Me)(iso-C$_3$H$_7$))$_2$, —SiMe(O—N=C(Me)(iso-C$_3$H$_7$))$_2$, —SiEt(O—N=C(Me)(iso-C$_3$H$_7$))$_2$, —SiVi(O—N=C(Me)(iso-C$_3$H$_7$))$_2$, —SiPh(O—N=C(Me)(iso-C$_3$H$_7$))$_2$, —Si(O—N=C(Me)(iso-C$_3$H$_7$))$_3$, —Si(n-C$_8$H$_{17}$)(O—N=C(Me)(n-C$_3$H$_7$))$_2$, —Si(CH$_2$—CH(CH$_3$)—CH$_2$—C(CH$_3$)$_2$—CH$_3$)(O—N=C(Me)(n-C$_3$H$_7$))$_2$, —Si(CH$_2$—CH(CH$_2$—CH$_3$)—(CH$_2$)$_3$—CH$_3$)(O—N=C(Me)(n-C$_3$H$_7$))$_2$, —Si(n-C$_8$H$_{17}$)(OMe)(O—N=C(Me)(n-C$_3$H$_7$)), —Si(CH$_2$—CH(CH$_3$)—CH$_2$—C(CH$_3$)$_2$—CH$_3$)(OMe)(O—N=C(Me)(n-C$_3$H$_7$)), —Si(CH$_2$—CH(CH$_2$—CH$_3$)—(CH$_2$)$_3$—CH$_3$)(OMe)(O—N=C(Me)(n-C$_3$H$_7$)), —Si(n-C$_8$H$_{17}$)(OEt)(O—N=C(Me)(n-C$_3$H$_7$)), —Si(CH$_2$—CH(CH$_3$)—CH$_2$—C(CH$_3$)$_2$—CH$_3$)(OEt)(O—N=C(Me)(n-C$_3$H$_7$)), —Si(CH$_2$—CH(CH$_2$—CH$_3$)—(CH$_2$)$_3$—CH$_3$)(OEt)(O—N=C(Me)(n-C$_3$H$_7$)), —Si(n-C$_8$H$_{17}$)(O—N=C(Me)(iso-C$_3$H$_7$))$_2$, —Si(CH$_2$—CH(CH$_3$)—CH$_2$—C(CH$_3$)$_2$—CH$_3$)(O—N=C(Me)(iso-C$_3$H$_7$))$_2$, —Si(CH$_2$—CH(CH$_2$—CH$_3$)—(CH$_2$)$_3$—CH$_3$)(O—N=C(Me)(iso-C$_3$H$_7$))$_2$, —Si(n-C$_8$H$_{17}$)(OMe)(O—N=C(Me)(iso- $C_3H_7$)), —Si($CH_2$—CH($CH_3$)—$CH_2$—C($CH_3$)$_2$—$CH_3$)(OMe)(O—N=C(Me)(iso-$C_3H_7$)), —Si($CH_2$—CH($CH_2$—$CH_3$)—($CH_2$)$_3$—$CH_3$)(OMe)(O—N=C(Me)(iso-$C_3H_7$)), —Si(n-$C_8H_{17}$)(OEt)(O—N=C(Me)(iso-$C_3H_7$)), —Si($CH_2$—CH($CH_3$)—$CH_2$—C($CH_3$)$_2$—$CH_3$)(OEt)(O—N=C(Me)(iso-$C_3H_7$)), —Si($CH_2$—CH($CH_2$—$CH_3$)—($CH_2$)$_3$—$CH_3$)(OEt)(O—N=C(Me)(iso-$C_3H_7$)), —SiMe(OMe)(O—N=C($CH_3$)$_2$), —SiVi(OMe)(O—N=C($CH_3$)$_2$), —SiPh(OMe)(O—N=C($CH_3$)$_2$), —SiEt(OMe)(O—N=C($CH_3$)$_2$), —SiMe(OEt)(O—N=C($CH_3$)$_2$), —SiVi(OEt)(O—N=C($CH_3$)$_2$), —SiPh(OEt)(O—N=C($CH_3$)$_2$), —SiEt(OEt)(O—N=C($CH_3$)$_2$), —Si(OMe)$_2$(O—N=C($CH_3$)$_2$), —Si(OEt)$_2$(O—N=C($CH_3$)$_2$), —Si(OMe)(O—N=C($CH_3$)$_2$)$_2$, —Si(OEt)(O—N=C($CH_3$)$_2$)$_2$, —SiMe(O—N=C($CH_3$)$_2$)$_2$, —SiEt(O—N=C($CH_3$)$_2$)$_2$, —SiVi(O—N=C($CH_3$)$_2$)$_2$, —SiPh(O—N=C($CH_3$)$_2$)$_2$, —Si(O—N=C($CH_3$)$_2$)$_3$, —Si(n-$C_8H_{17}$)(O—N=C($CH_3$)$_2$)$_2$, —Si($CH_2$—CH($CH_3$)—$CH_2$—C($CH_3$)$_2$—$CH_3$)(O—N=C($CH_3$)$_2$)$_2$, —Si($CH_2$—CH($CH_2$—$CH_3$)—($CH_2$)$_3$—$CH_3$)(O—N=C($CH_3$)$_2$)$_2$, —Si(n-$C_8H_{17}$)(OMe)(O—N=C($CH_3$)$_2$), —Si($CH_2$—CH($CH_3$)—$CH_2$—C($CH_3$)$_2$—$CH_3$)(OMe)(O—N=C($CH_3$)$_2$), —Si($CH_2$—CH($CH_2$—$CH_3$)—($CH_2$)$_3$—$CH_3$)(OMe)(O—N=C($CH_3$)$_2$), —Si(n-$C_8H_{17}$)(OEt)(O—N=C($CH_3$)$_2$), —Si($CH_2$—CH($CH_3$)—$CH_2$—C($CH_3$)$_2$—$CH_3$)(OEt)(O—N=C($CH_3$)$_2$), and —Si($CH_2$—CH($CH_2$—$CH_3$)—($CH_2$)$_3$—$CH_3$)(OEt)(O—N=C($CH_3$)$_2$);

lactylsilyl end groups, e.g., —SiMe(O—CH($CH_3$)—CO(OCH$_3$))$_2$, —SiVi(O—CH($CH_3$)—CO(OCH$_3$))$_2$, —SiPh(O—CH($CH_3$)—CO(OCH$_3$))$_2$, —SiMe(O—CH($CH_3$)—CO(OEt))$_2$, —SiVi(O—CH($CH_3$)—CO(OEt))$_2$, —SiPh(O—CH($CH_3$)—CO(OEt))$_2$, —Si(O—CH($CH_3$)—CO(OCH$_3$))$_3$, —Si(O—CH($CH_3$)—CO(OEt))$_3$, —Si(OMe)(O—CH($CH_3$)—CO(OCH$_3$))$_2$, —Si(OMe)(O—CH($CH_3$)—CO(OEt))$_2$, —Si(OMe)$_2$(O—CH($CH_3$)—CO(OCH$_3$)), —Si(OMe)$_2$(O—CH($CH_3$)—CO(OEt), —Si(OEt)(O—CH($CH_3$)—CO(OCH$_3$))$_2$, —Si(OEt)(O—CH($CH_3$)—CO(OEt))$_2$, —Si(OEt)$_2$(O—CH($CH_3$)—CO(OCH$_3$)), —Si(OEt)$_2$(O—CH($CH_3$)—CO(OEt)); —Si(n-$C_8H_{17}$)(O—CH($CH_3$)—CO(OCH$_3$))$_2$, —Si(n-CH$_{17}$)(O—CH($CH_3$)—CO(OEt))$_2$, —Si($CH_2$—CH($CH_3$)—$CH_2$—C($CH_3$)$_2$—$CH_3$)(O—CH($CH_3$)—CO(OCH$_3$))$_2$, —Si($CH_2$—CH($CH_3$)—$CH_2$—C($CH_3$)$_2$—$CH_3$)(O—CH($CH_3$)—CO(OEt))$_2$, —Si($CH_2$—CH($CH_2$—$CH_3$)—($CH_2$)$_3$—$CH_3$)(O—CH($CH_3$)—CO(OCH$_3$))$_2$, —Si($CH_2$—CH($CH_2$—$CH_3$)—($CH_2$)$_3$—$CH_3$)(O—CH($CH_3$)—CO(OEt))$_2$, —Si(n-$C_8H_{17}$)(OMe)(O—CH($CH_3$)—CO(OCH$_3$)), —Si(n-$C_8H_{17}$)(OMe)(O—CH($CH_3$)—CO(OEt)), —Si($CH_2$—CH($CH_3$)—$CH_2$—C($CH_3$)$_2$—$CH_3$)(OMe)(O—CH($CH_3$)—CO(OCH$_3$)), —Si($CH_2$—CH($CH_3$)—$CH_2$—C($CH_3$)$_2$—$CH_3$)(OMe)(O—CH($CH_3$)—CO(OEt)), and —Si($CH_2$—CH($CH_2$—$CH_3$)—($CH_2$)$_3$—$CH_3$)(OMe)(O—CH($CH_3$)—CO(OCH$_3$)), —Si($CH_2$—CH($CH_2$—$CH_3$)—($CH_2$)$_3$—$CH_3$)(OMe)(O—CH($CH_3$)—CO(OEt));

and other examples of end groups of the formula —SiR$_f$Y$_{3-f}$ with Y=OH, e.g., —SiMe$_2$OH, —SiMeViOH, —SiVi$_2$OH, —SiEt$_2$OH, —SiEtMeOH, —SiEtViOH, —SiMePhOH, —SiEtPhOH, —SiPh$_2$OH, —SiPhViOH;

where Me is the methyl radical, Et is the ethyl radical, Vi is vinyl radical, and Ph is the phenyl radical.

Although not shown in formula (II), the organosilicon compounds (A) used in accordance with the invention may as a result of their preparation have branching affecting up to 0.1% of all the units in the molecule, such as MeSiO$_{3/2}$ or SiO$_{4/2}$ units, for instance. The organosilicon compounds (A) used in accordance with the invention preferably have a dynamic viscosity of 100 to $10^6$ mPa·s, more preferably $10^3$ to 350,000 mPa·s, in each case at 25° C. The organosilicon compounds (A) are commercial products and/or may be prepared by techniques commonplace within silicon chemistry.

The component (B) used in accordance with the invention preferably has a specific BET surface area of 30 to 110 m$^2$/g, more preferably of 40 to 75 m$^2$/g. The silicon dioxide (B) used in accordance with the invention is finely divided silicon dioxide, preferably pyrogenically produced, finely divided silicon dioxide.

Examples of component (B) are the products HDK® D05 and HDK® C10 available from Wacker Chemie AG, Munich, DE, and also the Aerosil® OX 50 and Aerosil® 90 products available from Evonik Industries AG, Hanau-Wolfgang, DE, preference being given to the use of the products HDK® D05, Aerosil® OX 50, or Aerosil® 90.

In chemical terms, pyrogenically produced silicon dioxide consists preferably of high-purity amorphous silicon dioxide, and has the appearance of loose white powder. It is constructed of SiO$_{4/2}$ tetrahedra. These tetrahedra are joined to one another by siloxane bridges (Si—O—Si bonds). Preferably on average every second Si atom carries a hydroxyl group on the surface and so forms a silanol group.

Pyrogenically produced silicon dioxide is preferably hydrophilic and typically on average has preferably 1.5 to 2 silanol groups per 1 nm$^2$, is wetted by water, and can be dispersed in water.

The silicon dioxide (B) used in accordance with the invention may have been hydrophobized, although this is not preferred, by treatment, for example, with organosilanes and/or organosiloxanes, or with stearic acid, or by etherification of hydroxyl groups to alkoxy groups.

With particular preference, silicon dioxide (B) is hydrophilic, pyrogenically produced, finely divided silicon dioxide, more particularly hydrophilic, pyrogenically produced, finely divided silicon dioxide whose surface has not been hydrophobized with chemical substances.

Possible, though not preferred, is the use of wet-precipitated silicon dioxide as component (B), since such oxides generally have a high moisture content.

The silicon dioxide (B) used in accordance with the invention is preferably pyrogenically produced finely divided silicon dioxide having a carbon content of less than 2.0 wt %, more preferably less than 1.0 wt %. More particularly, the pyrogenically produced finely divided silicon dioxide (B) contains no carbon.

The silicon dioxide (B) used in accordance with the invention has a relative thickening effect of preferably 1.4 to 6.0, more preferably of 1.4 to 4.0, more particularly of 1.4 to 3.0.

Furthermore, the component (B) used in accordance with the invention exhibits a loss on drying in accordance with DIN EN ISO 787-2 (heating under ambient pressure at 105° C. to constant weight) of preferably not more than 10.0 wt %, more preferably not more than 5.0 wt %, more particularly of not more than 1.0 wt %.

The component (B) used in accordance with the invention has a pH in accordance with DIN EN ISO 787-9 (in 4% aqueous dispersion) of preferably 3.0 to 10.0, more preferably of 3.5 to 8.0, most preferably of 4.0 to 6.0.

The component (B) used in accordance with the invention comprises commercial products and/or may be prepared by any desired methods known to date, as for example by high-temperature hydrolysis of halosilicon compounds in an oxygen-hydrogen flame, as described in ULLMANNS ENZYKLOPÄDIE DER TECHNISCHEN CHEMIE, volume 21, page 462 (1982), for example.

The compositions of the invention preferably comprise component (B) in amounts of 10 to 100 parts by weight, more preferably 15 to 80 parts by weight, most preferably 20 to 70 parts by weight, based in each case on 100 parts by weight of organosilicon compound (A).

The hydrocarbon component (C) used in accordance with the invention is composed substantially of linear hydrocarbons and/or branched hydrocarbons and/or cyclic hydrocarbons, and is preferably a mineral oil product.

The hydrocarbon component (C) used in accordance with the invention consists preferably of one or more kinds of hydrocarbons and also, possibly, impurities, such as hydrocarbons substituted by S, N and/or O, for example. If the hydrocarbon component (C) includes impurities, the amounts in question are preferably not more than 10,000 mg/kg, more preferably not more than 1000 mg/kg, more particularly not more than 100 mg/kg.

The hydrocarbons present in component (C) consist substantially of hydrogen atoms and paraffinic and naphthenic carbon atoms. Naphthenic carbon atoms ($C_N$) in the sense of the invention are to be taken as those carbon atoms which are present in cyclic structural moieties of saturated alkanes. Paraffinic carbon atoms ($C_P$) in the sense of the invention are to be taken as those carbon atoms which are present in acyclic structural moieties of saturated alkanes. Aromatic carbon atoms ($C_A$) in the sense of the invention are to be taken as those carbon atoms which are present in aromatic structural moieties and are part of a conjugated double bond system. In the component (C), less than 0.1% of all carbon atoms are aromatic carbon atoms. Component (C) preferably comprises 60% to 80% of paraffinic carbon atoms, 20% to 40% of naphthenic carbon atoms, and less than 0.1% of aromatic carbon atoms.

A characteristic feature of the component (C) is that it has an initial boiling point above 150° C., preferably above 200° C., more preferably above 220° C., in each case at a pressure of 1013 hPa. A further characteristic feature of the component (C) is that it has a final boiling point of below 350° C., preferably below 340° C., more preferably below 330° C., in each case at a pressure of 1013 hPa.

The component (C) has a kinematic viscosity as measured at 40° C. of preferably 2.0 to 5.5 mm²/s, more preferably of 2.5 to 5.0 mm²/s, and preferably has a viscosity-density constant (VDC) of greater than 0.770 and less than or equal to 0.820, and a pour point on measurement of preferably less than −7° C., more preferably of less than −9° C.

Components (C) are commercial products and/or are preparable by chemical/physical methods. The compositions of the invention preferably comprise component (C) in amounts of 20 to 150 parts by weight, more preferably 30 to 120 parts by weight, and most preferably 40 to 90 parts by weight, based in each case on 100 parts by weight of organosilicon compound (A).

In addition to the above-described components (A), (B), and (C), the compositions of the invention may then comprise all further substances which are useful to date in compositions crosslinkable by condensation reaction, such as, for example, curing accelerators (D), crosslinkers (E), fillers (F), and additives (G), each of which are different from components (A), (B), and (C).

As curing accelerators (D) it is possible to use all curing accelerators which are useful in compositions crosslinkable by condensation reaction. Examples of curing accelerators (D) are titanium compounds, for example, tetrabutyl or tetraisopropyl titanate, or titanium chelates such as bis(ethylacetoacetato)diisobutoxytitanium, or organotin compounds, such as di-n-butyltin dilaurate and di-n-butyltin diacetate, di-n-butyltin oxide, dimethyltin diacetate, dimethyltin dilaurate, dimethyltin dineodecanoates, dimethyltin oxide, di-n-octyltin diacetate, di-n-octyltin dilaurate, di-n-octyltin oxide, and also reaction products of these compounds with alkoxysilanes such as tetraethoxysilane, di-n-butyltin diacetate, the reaction product of di-n-butyltin diacetate with tetraethoxysilane; preference is given to di-n-octyltin diacetate, di-n-octyltin dilaurate, reaction products of di-n-octyltin oxide with tetraethoxysilane, tetrabutyl titanate, tetraisopropyl titanate, or bis(ethylacetoacetato)diisobutoxytitanium.

If the compositions of the invention include curing accelerators (D), the amounts in question are preferably 0.1 to 20 parts by weight, more preferably 1 to 10 parts by weight, based in each case on 100 parts by weight of constituent (A). The compositions of the invention preferably comprise curing accelerators (D).

The crosslinkers (E) optionally employed in the compositions of the invention may be any useful crosslinkers having at least three hydrolyzable radicals, such as silanes or siloxanes having at least three organyloxy groups, for example.

The crosslinkers (E) used optionally in the compositions of the invention are preferably organosilicon compounds of the formula $$Z_c SiR^2_{(4-c)} \tag{III},$$

where
$R^2$ may be identical or different and denote monovalent, optionally substituted hydrocarbon radicals which may be interrupted by oxygen atoms,
Z may be identical or different and denotes a hydrolyzable radical, and
c is 3 or 4,
and also their partial hydrolyzates.

Examples of radical $R^2$ are the examples indicated above for radical R. Examples of radical Z are the radicals for hydrolyzable groups that were indicated above for radical Y. Preferred and more preferred radicals Z are the preferred and more preferred radicals for hydrolyzable groups that were stated above for Y. More particularly, radicals Z are methoxy, ethoxy, dimethylketoximo, methyl-n-propylketoximo, methylisopropylketoximo, or acetoxy radicals.

If organosilicon compounds (A) comprising units of the formula (I) where Y corresponds to hydrolyzable radicals, and also crosslinkers (E) of the formula (III), are employed in the compositions of the invention, radicals Y preferably have the same definition as radical Z.

Although not shown by formula (III), crosslinkers (E) may have a fraction of Si-bonded hydroxyl groups of preferably up to a maximum of 5% of all Si-bonded radicals.

The crosslinkers (E) optionally employed in the compositions of the invention are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, N-(trimethoxysilylmethyl)-O-methylcarbamate, (N-cyclohexylaminomethyl) triethoxysilane, 1,2-bis(trimethoxysilyl)ethane, 1,2-bis(triethoxysilyl)ethane, 3-aminopropyltriethoxysilane, 3-aminopropyltrimethoxysilane, N-(2-aminoethyl)-3-aminopropyltriethoxysilane, N-(2-aminoethyl)-3-aminopropyltrimethoxysilane, 3-aminopropylmethyldiethoxysilane, 3-aminopropylmethyldimethoxysilane, N-(2-amino ethyl)-3-aminopropylmethyldiethoxysilane, N-(2-amino ethyl)-3-aminopropylmethyldimethoxysilane, 3-glycidyloxypropyltrimethoxysilane, 3-glycidyloxypropyltriethoxysilane, 3-glycidyloxypropyldimethoxymethylsilane, and 3-glycidyloxypropyldiethoxymethylsilane, 2-(3,4-epoxy-cyclohexyl) ethyltriethoxysilane, 3-ureidopropyltrimethoxysilane, 3-ureidopropyltriethoxysilane, 1,3,5-tris[3-(trimethoxysilyl)

propyl]-1,3,5-triazine-2,4,6-(1H,3H,5H)-trione, 3-mercaptopropyltriethoxysilane, methyltris(methylethylketoximo)-silane, methyltris(dimethylketoximo)silane, ethyltris(dimethylketoximo)silane, methyltris(methyl-n-propylketoximo)silane, methyltris(methylisopropylketoximo) silane, vinyltris(methylethylketoximo)silane, vinyltris (dimethylketoximo)silane, vinyltris(methyl-n-propylketoximo)silane, vinyltris(methylisopropylketoximo) silane, vinylbis(dimethylketoximo)methoxysilane, vinylbis (methylethylketoximo)methoxysilane, tetrakis-(methylethylketoximo)silane, tetrakis(dimethylketoximo) silane, tetrakis(methyl-n-propylketoximo)silane, tetrakis (methylisopropylketoximo)silane, methyltriacetoxysilane, ethyltriacetoxysilane, vinyltriacetoxysilane, di(tert-butoxy) diacetoxysilane, N,N',N"-tricyclohexyl-1-methylsilanetriamine, 1-methyl-N,N',N"-tris(1-methylpropyl)silanetriamine, (2,3,5,6-tetrahydro-1,4-oxazin-4-yl) methyltrimethoxysilane, (2,3,5,6-tetrahydro-1,4-oxazin-4-yl)methyltriethoxysilane, (N,N-di-n-butylamino) methyltrimethoxysilane, (N,N-di-n-butylamino) methyltriethoxysilane, N-cyclohexylaminomethyltrimethoxysilane, N-cyclohexylaminomethyltriethoxysilane, n-butylaminomethyl-trimethoxysilane, n-butylaminomethyltriethoxysilane, (2,3,4,5,6-hexahydropyridin-1-yl)methyltrimethoxysilane, (2,3,4,5,6)-hexahydropyridin-1-yl)methyltriethoxysilane, (2,3,4,5-tetrahydropyrrol-1-yl)methyltrimethoxysilane, (2,3,4,5-tetrahydropyrrol-1-yl)methyltriethoxysilane; and also partial hydrolyzates of the stated organosilicon compounds, such as hexaethoxydisiloxane, for example.

More preferably, the crosslinkers (E) optionally employed in the compositions of the invention are tetramethoxysilane, tetraethoxysilane, methyltrimethoxysilane, methyltriethoxysilane, vinyltrimethoxysilane, vinyltriethoxysilane, methyltris(methylethylketoximo)silane, vinyltris(methylethylketoximo)silane, methyl-tris(dimethylketoximo)silane, ethyltris(dimethylketoximo)silane, vinyltris(dimethylketoximo)silane, methyltriacetoxysilane, ethyltriacetoxysilane, vinyltriacetoxysilane, (2,3,5,6-tetrahydro-1,4-oxazin-4-yl) methyltrimethoxysilane and (2,3,5,6-tetrahydro-1,4-oxazin-4-yl)methyltriethoxysilane, 3-aminopropyltriethoxysilane, 3-aminopropyltrimethoxysilane, N-(2-aminoethyl)-3-aminopropyltriethoxysilane, N-(2-aminoethyl)-3-aminopropyltrimethoxysilane, 3-aminopropylmethyldiethoxysilane, 3-aminopropylmethyldimethoxysilane, N-(2-aminoethyl)-3-aminopropylmethyldiethoxysilane, N-(2-aminoethyl)-3-aminopropylmethyldmethoxysilane, 3-glycidyloxypropyltrimethoxysilane, 3-glycidyloxypropyltriethoxysilane, 3-glycidyloxypropyldimethoxymethylsilane, and 3-glycidyloxypropyldiethoxymethylsilane, or 1,3,5-tris[3-(trimethoxysilyl)propyl]-1,3,5-triazine-2,4,6(1H,3H,5H)-trione.

Where the crosslinkers (E) optionally employed in the compositions of the invention are partial hydrolyzates of the abovementioned silanes, preference is given to those having up to 10 silicon atoms. The crosslinkers (E) are commercial products and/or may be prepared by methods that are known within silicon chemistry.

If the compositions of the invention include crosslinkers (E), the amounts are preferably 0.1 to 40 parts by weight, more preferably 0.1 to 30 parts by weight, and most preferably 0.1 to 20 parts by weight, based in each case on 100 parts by weight of organosilicon compound (A). The compositions of the invention preferably comprise crosslinkers (E).

Possible further fillers (F) which may be used, and which are different from (B), are nonreinforcing fillers (F), these being fillers having a BET surface area of up to 20 m²/g, such as quartz, diatomaceous earth, calcium silicate, zirconium silicate, zeolites, metal oxide powders, such as aluminum oxides, titanium oxides, iron oxides, or zinc oxides, and/or mixed oxides thereof, barium sulfate, calcium carbonate, gypsum, silicon nitride, silicon carbide, boron nitride, glass powders, and plastics powders, such as polyacrylonitrile powders; other reinforcing fillers different from (B), these being fillers having a BET surface area of more than 20 m²/g, such as precipitated chalk and carbon black, such as furnace black and acetylene black fibrous fillers, such as asbestos and also polymeric fibers.

If the compositions of the invention include fillers (F), the amounts are preferably 10 to 150 parts by weight, more preferably 10 to 130 parts by weight, and most preferably 10 to 100 parts by weight, based in each case on 100 parts by weight of organosilicon compound (A). The compositions of the invention preferably contain no filler (F).

Examples of additives (G) are pigments, dyes, odorants, oxidation inhibitors, agents for influencing the electrical properties such as conductive carbon black, flame retardants, light stabilizers, biocides such as fungicides, bactericides, and acaricides, cell generators, an example being azodicarbonamide, heat stabilizers, scavengers, such as Si—N containing silazanes or silylamides, as for example N,N'-bistrimethylsilylurea or hexamethyldisilazane, cocatalysts such as Lewis acids and Brønsted acids, examples being sulfonic acids, phosphoric acids, phosphoric esters, phosphonic acids, and phosphonic esters, thixotropic agents, for example, castor oil or polyethylene glycol with OH termination at one or both ends, agents for further regulating the modulus, such as polydimethylsiloxanes having an OH end group, and also any siloxanes which are different from component (A).

If the compositions of the invention include additives (G), the amounts are preferably 0.1 to 20 parts by weight, more preferably 0.1 to 15 parts by weight, and most preferably 0.1 to 10 parts by weight, based in each case on 100 parts by weight of organosilicon compound (A).

The individual constituents of the compositions of the invention may in each case comprise one kind of such a constituent or else a mixture of at least two different kinds of such constituents.

The compositions of the invention are preferably compositions which comprise
(A) at least one organosilicon compound of the formula (II), (B) at least one finely divided silicon dioxide,
(C) at least one hydrocarbon component,
(E) at least one crosslinker of the formula (III), optionally
(D) curing accelerators, optionally
(F) fillers, and optionally
(G) additives.

The compositions of the invention are more preferably compositions which comprise
(A) at least one organosilicon compound of the formula (II), (B) at least one finely divided silicon dioxide,
(C) at least one hydrocarbon component,
(E) at least one crosslinker of the formula (III),
(D) at least one curing accelerator, and optionally
(G) additives.

The compositions of the invention are more particularly compositions which comprise
(A) at least one organosilicon compound of the formula (II), (B) at least one finely divided silicon dioxide,
(C) at least one hydrocarbon component having a kinematic viscosity of 2.0 to 5.5 mm²/s at 40° C., a viscosity-density constant of less than or equal to 0.82, and comprising 20-40% of naphthenic carbon atoms and 60-80% of paraffinic carbon atoms, and less than 0.1% of aromatic carbon atoms, (E) at least one crosslinker of the formula (III),
(D) at least one curing accelerator, and optionally
(G) additives.

The compositions of the invention preferably contain no constituents other than components (A) to (G), are preferably compositions with a consistency from thick to pastelike, and have an extrusion rate of preferably more than 40 g/min, more preferably of more than 45 g/min.

In order to provide the compositions of the invention it is possible to mix all of the constituents with one another in any order. This mixing may take place at room temperature under the pressure of the surrounding atmosphere, in other words about 900 to 1100 hPa. If desired, however, this mixing may also take place at higher temperatures, as for example at temperatures in the range from 35 to 135° C. A further possibility is to carry out mixing occasionally or continually under reduced pressure, such as at absolute pressure of 30 to 500 hPa, for example, in order to remove volatile compounds or air. Preparation of the mixture may take place continuously or batchwise in accordance with known methods and using known apparatus.

The mixing of the invention takes place preferably with very substantial exclusion of water i.e., with use of raw materials having a water content of preferably less than 10,000 mg/kg, more preferably less than 5000 mg/kg, and most preferably less than 1000 mg/kg. The mixing operation is preferably accompanied by blanketing with dry air or inert gas such as nitrogen, with the gas in question preferably having a moisture content of less than 10,000 mg/kg, more preferably less than 1000 mg/kg, and most preferably less than 500 mg/kg. Following their preparation, the pastes are dispensed into commercial moisture-tight containers, such as cartridges, tubular pouches, pails, and drums. The invention thus additionally provides a method for producing the compositions of the invention by mixing of the individual constituents.

The customary water content of the air is sufficient for crosslinking the compositions of the invention. Crosslinking of the compositions of the invention preferably takes place at room temperature. It may, if desired, also be carried out at temperatures higher or lower than room temperature, as for example at −5° to 15° C. or at 30° C. to 50° C., and/or by means of water concentrations exceeding the standard water content of the air. Crosslinking is preferably carried out under a pressure of 100 to 1100 hPa, more particularly under the pressure of the surrounding atmosphere, i.e., about 900 to 1100 hPa.

The present invention further provides shaped articles produced by crosslinking the compositions of the invention. The shaped articles of the invention preferably have a tear resistance of at least 10 kN/m. The compositions of the invention can be used for all utilities for which it is possible to employ compositions which are storable with exclusion of water but undergo crosslinking to resins or elastomers at room temperature on ingress of water.

Compositions of the invention therefore possess outstanding suitability as, for example, sealants for joints, including joints extending vertically, and similar cavities with an inside width of 10 to 40 mm, for example, such as in buildings, land vehicles, water vehicles, and aircraft, or as adhesives or putties, in window construction or in the production of glass cabinets, for example, and also, for example, for producing protective coatings, including those for surfaces exposed to the continual action of fresh or salt water, or slip-preventing coatings, or of rubber-elastic articles.

An advantage of the compositions of the invention is that they are easily produced and are distinguished by very high stability in storage. An advantage, furthermore, of the compositions of the invention is that they exhibit very good handling qualities in application, and have excellent processing properties in a multiplicity of applications. In addition, the crosslinkable compositions of the invention in the non-crosslinked state in the form of pastes, exhibit ready extrudibility from the cartridge, referred to as the extrusion rate.

A further advantage of the crosslinkable compositions of the invention is that they adhere very well to a multiplicity of substrates, and that in both in the unvulcanized state and in the vulcanized state they exhibit high compatibility of the hydrocarbon component (C) with the siloxane matrix, and hence there is no visible exudation even at low temperatures, such as around 0° C. or −20° C., for example.

Furthermore, an advantage of the compositions of the invention is that in the cured state the cured vulcanizates attain high tear resistance values, and are very economic with regard to the substances employed.

In the examples described below, all figures for the dynamic viscosities, unless otherwise indicated, relate to a temperature of 25° C., and the figures for the kinematic viscosities, unless otherwise indicated, relate to a temperature of 40° C. Unless otherwise indicated, the examples below are carried out under the pressure of the surrounding atmosphere, i.e., at about 1013 hPa, and at room temperature, i.e., at about 23° C., or at a temperature which comes about when the reactants are combined at room temperature without additional heating or cooling. The examples which follow use raw materials which had a water content of less than 5000 mg/kg, and the mixtures, during preparation, were blanketed with dry air (moisture content not more than 0.12 g/m$^3$).

In the descriptions given below of the hydrocarbon mixtures (HCM-1 to HCM-7), the amount of paraffinic ($C_P$) and naphthenic ($C_N$) carbon atoms was determined from the Nomogramm in ASTM D 2140-08 (page 2, FIG. 1). The proportions of the individual varieties of carbon atom were rounded up to whole numbers in accordance with DIN 1333 section 4.5 of 1992. Consequently, the amount of aromatic ($C_A$) carbon atoms to be used in determining the carbon distribution is always 0%. Accordingly, the point of intersection of the optionally interpolated VDC line with the base line, i.e., at 0% aromatic carbon atoms ($C_A$), gives the distribution of the paraffinic ($C_P$) and naphthenic ($C_N$) carbon atoms.

HCM-1: Hydrocarbon component having an initial boiling point of 278° C., a final boiling point of 322° C., in each case at a pressure of 1013 hPa, a VDC of 0.795, a kinematic viscosity of 4.1 mm$^2$/s, as measured at 40° C., a pour point of −19° C., a naphthenic carbon atom content of 30% $C_N$ and a paraffinic carbon atom content of 70% $C_P$.

HCM-2: Hydrocarbon component having an initial boiling point of 236° C., a final boiling point of 262° C., in each case at a pressure of 1013 hPa, a VDC of 0.811, a kinematic viscosity of 2.4 mm$^2$/s, as measured at 40° C., a pour point of −50° C., a naphthenic carbon atom content of 36% $C_N$ and a paraffinic carbon atom content of 64% $C_P$.

HCM-3: Hydrocarbon component having an initial boiling point of 254° C., a final boiling point of 282° C., in each case at a pressure of 1013 hPa, a VDC of 0.806, a kinematic viscosity of 2.9 mm$^2$/s, as measured at 40° C., a pour point of −40° C., a naphthenic carbon atom content of 34% $C_N$ and a paraffinic carbon atom content of 66% $C_P$.

HCM-4: Hydrocarbon component having an initial boiling point of 256° C., a final boiling point of 329° C., in each case at a pressure of 1013 hPa, a VDC of 0.798, a kinematic viscosity of 3.5 mm$^2$/s, as measured at 40° C., a pour point of −25° C., a naphthenic carbon atom content of 31% $C_N$ and a paraffinic carbon atom content of 69% $C_P$.

HCM-5: Hydrocarbon component having an initial boiling point of 304° C., a final boiling point of 347° C., in each case at a pressure of 1013 hPa, a VDC of 0.787, a kinematic viscosity of 6.0 mm$^2$/s, as measured at 40° C., a pour point of −2° C., a naphthenic carbon atom content of 21% $C_N$ and a paraffinic carbon atom content of 79% $C_P$.

HCM-6: Hydrocarbon component having an initial boiling point of 300° C., a final boiling point of 350° C., in each case at a pressure of 1013 hPa, a VDC of 0.791, a kinematic viscosity of 6.1 mm$^2$/s, as measured at 40° C., a pour point of −48° C., a naphthenic carbon atom content of 26% $C_N$ and a paraffinic carbon atom content of 72% $C_P$.

HCM-7: Hydrocarbon component having an initial boiling point of 300° C., a final boiling point of 350° C., in each case at a pressure of 1013 hPa, a VDC of 0.790, a kinematic viscosity of 6.0 mm$^2$/s, as measured at 40° C., a pour point of −18° C., a naphthenic carbon atom content of 27% $C_N$ and a paraffinic carbon atom content of 73% $C_P$.

INVENTIVE EXAMPLE 1

100 parts by weight of an α,ω-dihydroxypolydimethylsiloxane having a dynamic viscosity of 75,000 mPa·s at 25° C. (commercially available under the name Polymer FD 80 from Wacker Chemie AG, Munich, DE), 63 parts by weight of HMC-1, and 8 parts by weight of ethyltrisacetoxysilane (commercially available under the name Vernetzer ES 23 from Wacker Chemie AG, Munich, DE) were mixed with one another in a planetary mixer and stirred for 15 minutes. Then 37.8 parts by weight of a fumed silicon dioxide having a specific BET surface area of 52 mg$^2$/g and a relative thickening effect of 2.0 (commercially available under the name HDK® D05 from Wacker Chemie AG, Munich, DE) were mixed in, and the mixture was fully homogenized under an absolute pressure of 100 mbar. Lastly, 0.018 part by weight of dibutyltin diacetate was added, and the mixture was stirred under an absolute pressure of 100 mbar for 5 minutes more. The resulting RTV-1 sealant was dispensed into moisture-tight commercial polyethylene cartridges.

INVENTIVE EXAMPLE 2

The procedure described in inventive example 1 is repeated, with the modification that instead of 63 parts by weight of HCM-1, 63 parts by weight of HCM-2 were used.

INVENTIVE EXAMPLE 3

The procedure described in inventive example 1 is repeated, with the modification that instead of 63 parts by weight of HCM-1, 63 parts by weight of HCM-3 were used.

INVENTIVE EXAMPLE 4

The procedure described in inventive example 1 is repeated, with the modification that instead of 63 parts by weight of HCM-1, 63 parts by weight of HCM-4 were used.

COMPARATIVE EXAMPLE C1

The procedure described in inventive example 1 is repeated, with the modification that instead of 63 parts by weight of HCM-1, 63 parts by weight of HCM-5 were used.

COMPARATIVE EXAMPLE C2

The procedure described in inventive example 1 is repeated, with the modification that instead of 63 parts by weight of HCM-1, 63 parts by weight of HCM-6 were used.

COMPARATIVE EXAMPLE C3

The procedure described in inventive example 1 is repeated, with the modification that instead of 63 parts by weight of HCM-1, 63 parts by weight of HCM-7 were used.

COMPARATIVE EXAMPLE C4

The procedure described in inventive example 1 is repeated, with the modification that instead of 63 parts by weight of HCM-1, 63 parts by weight of a α,ω-bis(trimethylsiloxy)polydimethylsiloxane having a dynamic viscosity of 100 mPa·s at 25° C. (commercially available under the name Siliconöl AK 100 from Wacker Chemie AG, Munich, DE) were used.

COMPARATIVE EXAMPLE C5

The procedure described in inventive example 1 is repeated, with the modification that instead of 63 parts by weight of HCM-1, 63 parts by weight of a α,ω-bis(trimethylsiloxy)polydimethylsiloxane having a dynamic viscosity of 10 mPa·s at 25° C. (commercially available under the name Siliconöl AK 10 from Wacker Chemie AG, Munich, DE) were used.

INVENTIVE EXAMPLE 5

The procedure described in inventive example 1 is repeated, with the modification that instead of 37.8 parts by weight of the fumed silicon dioxide used in inventive example 1 and having a specific BET surface area of 52 m$^2$/g, 31.0 parts by weight of a fumed silicon dioxide having a specific BET surface area of 101 m$^2$/g and a relative thickening effect of 2.8 (commercially available under the name HDK® C10 from Wacker Chemie AG, Munich, DE) were used.

INVENTIVE EXAMPLE 6

The procedure described in inventive example 1 is repeated, with the modification that instead of 37.8 parts by weight of the fumed silicon dioxide used in inventive example 1 and having a specific BET surface area of 52 m$^2$/g, 31.0 parts by weight of a fumed silicon dioxide having a specific BET surface area of 90 m$^2$/g and a relative thickening effect of 3.5 (commercially available under the name AEROSIL® 90 from Evonik Industries AG, Hanau, DE) were used.

COMPARATIVE EXAMPLE C6

The procedure described in inventive example 1 is repeated, with the modification that instead of 37.8 parts by weight of the fumed silicon dioxide mentioned in inventive example 1 and having a specific BET surface area of 52 m$^2$/g and a relative thickening effect of 2.0, 25.0 parts by weight of a fumed silicon dioxide having a specific BET surface area of 155 m$^2$/g and a relative thickening effect of 4.5 (commercially available under the name HDK® V15 from Wacker Chemie AG, Munich, DE) were used.

INVENTIVE EXAMPLE 7

100 parts by weight of an α,ω-dihydroxypolydimethylsiloxane having a dynamic viscosity of 75,000 mPa·s at 25° C.

(commercially available under the name Polymer FD 80 from Wacker Chemie AG, Munich, DE), 63 parts by weight of HMC-1, 3.5 parts by weight of (2,3,5,6-tetrahydro-1,4-oxazin-4-yl)methyltriethoxysilane, 3.5 parts by weight of a methyltriethoxysilane hydroylzate having an ethoxy content of 37% (commercially available under the name TRASIL® from Wacker Chemie AG, Munich, DE), 0.1 part by weight of 1,2-bis(triethoxysilyl)ethane (commercially available under the name Vernetzer ET 13 from Wacker Chemie AG, Munich, DE), 1.3 parts by weight of tetraethyl silicate (commercially available under the name Silikat TES 28 from Wacker Chemie AG, Munich, DE), 2.7 parts by weight of vinyltriethoxysilane (commercially available under the name GENIOSIL® GF 56 from Wacker Chemie AG, Munich, DE), 3 parts by weight of 3-aminopropyltriethoxysilane (commercially available under the name GENIOSIL® GF 93 from Wacker Chemie, AG, Munich, DE), and 0.6 part by weight of a polyethylene glycol-polypropylene glycol copolymer having a dynamic viscosity of 200 mPa·s at 50° C. (commercially available under the name Stabilisator 43 from Wacker Chemie AG, Munich, DE) were charged to a planetary mixer and mixed for 30 minutes. Then 45 parts by weight of a fumed silicon dioxide having a specific BET surface area of 52 mg$^2$/g and a relative thickening effect of 2.0 (commercially available under the name HDK® D05 from Wacker Chemie AG, Munich, DE) were mixed in, and the mixture was fully homogenized under an absolute pressure of 100 mbar. The batch was subsequently completed by incorporation, with mixing, of 0.5 part by weight of a solution of n-octylphosphonic acid in methyltrimethoxysilane, and 0.23 part by weight of a tin catalyst prepared by reacting di-n-butyltin diacetate and tetraethoxysilane (commercially available under the name Katalysator 41 from Wacker Chemie AG, Munich, DE). Finally, the mixture was stirred under an absolute pressure of about 100 mbar for 5 minutes. The resulting RTV-1 sealant was dispensed into moisture-tight commercial polyethylene cartridges.

INVENTIVE EXAMPLE 8

103.5 parts by weight of a methyldimethoxysilyl-terminated polydimethylsiloxane having a dynamic viscosity of 50 000 mPa·s at 25° C. (commercially available under the name Polymer NG 410-50 000 from Wacker Chemie AG, Munich, DE) and 63 parts by weight of HCM-1 were charged to a planetary mixer and stirred for 5 minutes. Then 3.0 parts by weight of methyltrimethoxysilane (commercially available under the name Silan M1-Trimethoxy from Wacker Chemie AG, Munich, DE) and 3.0 parts by weight of vinyltrimethoxysilane (commercially available under the name GENIOSIL® XL10 from Wacker Chemie AG, Munich, DE) were added and stirring was carried out for 10 minutes. The batch was subsequently extended by incorporation, with mixing, of 3.0 parts by weight of bis(ethylacetoacetato)diisobutoxytitanium (commercially available under the name Tyzor® IBAY from Du Pont de Nemours (Belgium) BVBA, Kallo, BE), followed by stirring for 10 minutes more. The batch was subsequently completed by homogeneous incorporation, with mixing, of 38 parts by weight of a fumed silicon dioxide having a specific BET surface area of 52 m$^2$/g and a relative thickening effect of 2.0 (commercially available under the name HDK® D05 from Wacker Chemie AG, Munich, DE). Finally, the mixture was stirred under an absolute pressure of about 100 mbar for 10 minutes. The resulting RTV-1 sealant was dispensed into moisture-tight commercial polyethylene cartridges.

INVENTIVE EXAMPLE 9

100 parts by weight of an α,ω-dihydroxypolydimethylsiloxane having a dynamic viscosity of 75,000 mPa·s at 25° C. (commercially available under the name Polymer FD 80 from Wacker Chemie AG, Munich, DE), 63 parts by weight of HMC-1, 7.1 parts by weight of methyltris(methylethylketoximino)silane (commercially available under the name OS® 1000 from Honeywell International, Inc., Morristown, N.J. 07962, US), 2.6 parts by weight of a vinyltris(methylethylketoximino)silane (commercially available under the name OS® 2000 from Honeywell International, Inc., Morristown, N.J. 07962, US), and 1.5 parts by weight of 3-aminopropyltriethoxysilane (commercially available under the name GENIOSIL® GF 93 from Wacker Chemie AG, Munich, DE) were charged to a planetary mixer and mixed for 30 minutes. Then 56 parts by weight of a fumed silicon dioxide having a specific BET surface area of 52 mg$^2$/g and a relative thickening effect of 2.0 (commercially available under the name HDK® D05 from Wacker Chemie AG, Munich, DE) were mixed in, and the mixture was fully homogenized under an absolute pressure of about 100 mbar. Lastly, the batch was completed by incorporation, with mixing, of 0.1 part by weight of dioctyltin dilaurate (commercially available under the name Metatin® Katalysator 812 ES from Rohm and Haas, Frankfurt, DE). Finally, the mixture was stirred under an absolute pressure of about 100 mbar for a further 5 minutes. The resulting RTV-1 sealant was dispensed into moisture-tight commercial polyethylene cartridges.

EXAMPLE 10

The compositions obtained in the examples described above were investigated for sag resistance, extrusion rate, skinning time, 100% modulus, tensile strength, Shore A hardness, tear resistance, and exudation.
Description of the Test Methods
Prior to assessment of the properties (sag resistance, extrusion rate, skinning time, 100% modulus, tensile strength, Shore A hardness, tear resistance, and exudation) by the test methods described below, samples of the respective product were first stored in cartridges with airtight and moisture-tight sealing, for 24 hours at 23° C.

The skinning time was determined at 50% relative atmospheric humidity and 23° C. In this case, the surface of a freshly applied composition was contacted gently at 3-minute intervals with the point of a pencil, sharpened beforehand, of hardness HB. The skinning time is reached when composition no longer remains hanging from the point of the pencil.

The sag resistance was determined in accordance with DIN EN ISO 7390: The respective composition was placed in a U-shaped aluminum profile with dimensions of 150 mm×20 mm×10 mm (length×width×depth), after which the test specimen was set up vertically and stored at room temperature. Evaluation commenced 2 hours after the test specimen had been stood up. After a further 2 hours, a further check was carried out and, if any change had occurred, a further check took place after 2 hours. The assessment in each case was whether the composition has emerged downwardly out of the profile. The result was assessed as positive (pos) if the sealant had emerged not more than 2 mm from the profile; the result was assessed as negative (neg) if the sealant had emerged more than 2 mm from the profile.

To determine the mechanical characteristics (100% modulus, tensile strength, tear resistance), sheets each 2 mm thick were coated onto polyethylene films, and after curing for 24 hours were detached from the film and suspended in a way that allowed air to enter from all sides for a further 144 hours, so that the samples were cured over a total of 168 hours. The relative atmospheric humidity during this procedure was 50% at a temperature of 23° C. For the determination of the mechanical characteristics of 100% modulus and tensile strength, seven test specimens of S2 shape according to DIN 53504 were punched from the vulcanizate in each case; the reported value for the 100% modulus and for the tensile strength corresponds to the respective average value of the individual measurements. For the determination of the tear resistance, three test specimens were punched from the vulcanizate in each case according to method C of DIN ISO 34-1, in two directions at an angle of 90° to one another; the reported value corresponds to the average value of the median values for both removal directions, and has been rounded to whole numbers.

For the determination of the Shore A hardness in accordance with DIN 53505, test specimens 6 mm thick were produced, and were likewise cured over 168 hours at a relative atmospheric humidity of 50% and a temperature of 23° C., by reaction with the ambient air moisture.

For the exudation, sheets 2 mm thick were coated onto polyethylene films, and were cured over 72 hours at a relative atmospheric humidity of 50% and a temperature of 23° C., by reaction with the ambient air moisture. Following storage, test specimens with a size of 8 cm×3 cm (length×width) were cut from the vulcanizate sheets and weighed (=mass $m_1$). The weighed test specimens were placed between two sheets of filter paper that had been weighed beforehand (=mass $m_2$). The filter paper is selected such that it fully absorbs any oil that exudes (e.g., a Whatman® 589/2 brand filter paper). One test specimen in each case was subsequently stored for 3 hours at a temperature of 23° C. and a relative atmospheric humidity of 50%, at a temperature of 0° C. and a relative atmospheric humidity of 50%, and in a commercial refrigerator at −20° C. Thereafter, both sheets of filter paper were briefly pressed on by hand, the test specimens were removed, and the filter paper sheets were weighed again (=mass $m_3$). The exudation, expressed in weight %, corresponds to the ratio of the difference in mass ($m_3-m_2$) to the mass $m_1$, multiplied by 100%, and is a measure of the incompatibility of the plasticizer with the silicon rubber matrix:

Exudation=$(m_3-m_2)/m_1 \times 100\%$

For the determination of the extrusion rate, a full cartridge with a content of about 300 ml was discharged for 15 seconds at an extrusion pressure of 2.5 bar through a nozzle aperture of 3 mm, and the mass of paste extruded was weighed. The result was then multiplied by four and hence extrapolated to an extrusion rate in grams per minute.

The results are found in tables 1 to 3:

TABLE 1

| Example | | 1 | 2 | 3 | 4 | 5 | 6 |
|---|---|---|---|---|---|---|---|
| Silicon dioxide | | D05 | D05 | D05 | D05 | C10 | AE90 |
| parts by weight | | 37.8 | 37.8 | 37.8 | 37.8 | 30.0 | 31.0 |
| Plasticizer | | HCM-1 | HCM-2 | HCM-3 | HCM-4 | HCM-1 | HCM-1 |
| parts by weight | | 63.0 | 63.0 | 63.0 | 63.0 | 63.0 | 63.0 |
| Sag resistance | | pos | pos | pos | Pos | pos | pos |
| Extrusion rate | [g/min] | 84 | 124 | 96 | 92 | 48 | 68 |
| Skinning time | [min] | 24 | 21 | 21 | 21 | 12 | 12 |
| 100% modulus | [MPa] | 0.39 | 0.44 | 0.41 | 0.39 | 0.46 | 0.50 |
| Tensile strength | [MPa] | 2.13 | 2.98 | 2.52 | 2.49 | 2.49 | 1.80 |
| Hardness [Shore A] | | 24 | 26 | 25 | 25 | 24 | 25 |
| Tear resistance | [kN/m] | 11 | 14 | 12 | 11 | 19 | 11 |
| Exudation (23° C.) | [%] | 0.0 | 0.0 | 0.0 | 0.0 | 0.0 | 0.0 |
| Exudation (0° C.) | [%] | 0.0 | 0.2 | 0.1 | 0.0 | 0.0 | 0.0 |
| Exudation (−20° C.) | [%] | 0.0 | 0.0 | 0.0 | 0.0 | 0.0 | 0.0 |

TABLE 2

| Example | | C1 | C2 | C3 | C4 | C5 |
|---|---|---|---|---|---|---|
| Silicon dioxide | | D05 | D05 | D05 | D05 | D05 |
| parts by weight | | 37.8 | 37.8 | 37.8 | 37.8 | 37.8 |
| Plasticizer | | HCM-5 | HCM-6 | HCM-7 | AK100 | AK10 |
| parts by weight | | 63.0 | 63.0 | 63.0 | 63.0 | 63.0 |
| Sag resistance | | pos | pos | pos | pos | pos |
| Extrusion rate | [g/min] | 72 | 76 | 80 | 36 | 56 |
| Skinning time | [min] | 9 | 9 | 15 | 21 | 18 |
| 100% modulus | [MPa] | 0.41 | 0.41 | 0.40 | 0.36 | 0.24 |
| Tensile strength | [MPa] | 1.49 | 0.98 | 1.31 | 1.89 | 1.42 |
| Hardness [Shore A] | | 25 | 24 | 25 | 24 | 16 |
| Tear resistance | [kN/m] | 5 | 4 | 5 | 14 | 8 |
| Exudation (23° C.) | [%] | 0.5 | 0.4 | 3.1 | 0.0 | 0.0 |
| Exudation (0° C.) | [%] | 2.1 | 3.0 | 2.3 | 0.0 | 0.0 |
| Exudation (−20° C.) | [%] | 0.7 | 2.8 | 1.4 | 0.0 | 0.0 |

TABLE 3

| | | C6 | Example 7 | 8 | 9 |
|---|---|---|---|---|---|
| Silicon dioxide parts by weight | | V15 25.0 | D05 45.0 | D05 43.0 | D05 56.0 |
| Plasticizer parts by weight | | HCM-1 63.0 | HCM-1 63.0 | HCM-1 63.0 | HCM-1 63.0 |
| Sag resistance | | pos | pos | pos | pos |
| Extrusion rate | [g/min] | 12 | 48 | 132 | 52 |
| Skinning time | [min] | 6 | 9 | 15 | 9 |
| 100% modulus | [MPa] | 0.42 | 0.45 | 0.41 | 0.56 |
| Tensile strength | [MPa] | 2.22 | 1.95 | 1.76 | 2.09 |
| Hardness [Shore A] | | 22 | 30 | 28 | 35 |
| Tear resistance | [kN/m] | 6 | 11 | 10 | 15 |
| Exudation (23° C.) | [%] | 0.0 | 0.0 | 0.0 | 0.0 |
| Exudation (0° C.) | [%] | 0.0 | 0.0 | 0.0 | 0.0 |
| Exudation (−20° C.) | [%] | 0.0 | 0.0 | 0.0 | 0.0 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composition crosslinkable by a condensation reaction, comprising:
   (A) at least one organosilicon compound having at least two condensable radicals,
   (B) at least one finely divided silicon dioxide having a BET surface area of 30 to 120 m²/g and a relative thickening effect $\eta_{rel}$ of 1.4 to 10, and
   (C) at least one hydrocarbon component which has an initial boiling point above 150° C., a final boiling point below 350° C., each at a pressure of 1013 hPa, a kinematic viscosity of 1.5 to 6.0 mm²/s as measured at 40° C., a viscosity-density constant (VDC) of less than or equal to 0.820, a pour point of less than −5° C., and an aromatic carbon atom ($C_A$) content of less than 0.1% $C_A$.

2. The composition as claimed in claim 1, wherein the organosilicon compounds (A) are compounds comprising units of the formula $$R_aY_bSiO_{(4-a-b)/2} \quad (I),$$

where
R are identical or different and denote optionally substituted hydrocarbon radicals which are optionally interrupted by oxygen atoms,
Y are identical or different and denotes the hydroxyl radical or a hydrolyzable radical,
a is 0, 1, 2, or 3, and
b is 0, 1, 2, or 3,
with the proviso that the sum total of a+b is less than or equal to 3 and there are at least two radicals Y present per molecule.

3. The composition of claim 1, wherein component (B) comprises a hydrophilic, pyrogenically produced, finely divided silicon dioxide.

4. The composition of claim 1, which comprises component (B) in amounts of 10 to 100 parts by weight, based on 100 parts by weight of organosilicon compound (A).

5. The composition of claim 1, wherein component (C) comprises 60% to 80% of paraffinic carbon atoms, 20% to 40% of naphthenic carbon atoms, and less than 0.1% of aromatic carbon atoms.

6. The composition of claim 1, which comprises component (C) in amounts of 20 to 150 parts by weight, based on 100 parts by weight of organosilicon compound (A).

7. The composition of claim 1, which comprises
(A) at least one organosilicon compound of the formula (II)

$$Y_{3-f}R_fSi-O-(SiR_2-O)_e-SiR_fY_{3-f} \quad (II),$$

where
R are identical or different and denote optionally substituted hydrocarbon radicals which are optionally interrupted by oxygen atoms,
Y are identical or different and denotes the hydroxyl radical or a hydrolyzable radical,
e is 30 to 3000, and
f is 0, 1, or 2,
(B) at least one finely divided silicon dioxide,
(C) at least one hydrocarbon component,
(E) at least one crosslinker of the formula (III), $$Z_cSiR^2_{(4-c)} \quad (III),$$

where
$R^2$ each is identical or different and denote monovalent, optionally substituted hydrocarbon radicals optionally interrupted by oxygen atoms,
Z each is identical or different and denotes a hydrolyzable radical, and
c is 3 or 4,
and also their partial hydrolyzates,
(D) optionally, curing accelerators,
(F) optionally, fillers, and
(G) optionally, further additives different from (A) through (F).

8. The composition of claim 1, which comprises
(A) at least one organosilicon compound of the formula (II), $$Y_{3-f}R_fSi-O-(SiR_2-O)_e-SiR_fY_{3-f} \quad (II),$$

where
R are identical or different and denote optionally substituted hydrocarbon radicals which are optionally interrupted by oxygen atoms,
Y are identical or different and denotes the hydroxyl radical or a hydrolyzable radical,
e is 30 to 3000, and
f is 0, 1, or 2,
(B) at least one finely divided silicon dioxide,
(C) at least one hydrocarbon component,
(E) at least one crosslinker of the formula (III), $$Z_cSiR^2_{(4-c)} \quad (III),$$

where
$R^2$ each is identical or different and denote monovalent, optionally substituted hydrocarbon radicals optionally interrupted by oxygen atoms,
Z each is identical or different and denotes a hydrolyzable radical, and
c is 3 or 4,
and also their partial hydrolyzates,
(D) at least one curing accelerator,
and optionally
(G) additives different from (A) through (E).

9. A method for producing the composition of claim 1, comprising mixing the individual constituents.

10. A shaped article produced by crosslinking a composition produced by the method of claim 9.

11. The shaped article of claim 10, which has a tear resistance of at least 10 kN/m.

12. A shaped article produced by crosslinking a composition of claim 1.

13. The shaped article of claim 12, which has a tear resistance of at least 10 kN/m.

* * * * *